United States Patent
Kleinpenning et al.

(10) Patent No.: US 9,923,475 B2
(45) Date of Patent: Mar. 20, 2018

(54) SYNCHRONOUS RECTIFIER

(71) Applicant: NXP B.V., Eindhoven (NL)

(72) Inventors: Jeroen Kleinpenning, Nijmegen (NL); Jan Dikken, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/142,615

(22) Filed: Apr. 29, 2016

(65) Prior Publication Data

US 2017/0317602 A1  Nov. 2, 2017

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0009* (2013.01)

(58) Field of Classification Search
CPC .... H02M 1/08; H02M 3/335; H02M 3/33507; H02M 3/33576; H02M 3/33592; H02M 2001/0009
See application file for complete search history.

(56) References Cited

U.S. PATENT DOCUMENTS

| | | | |
|---|---|---|---|
| 7,869,231 B2* | 1/2011 | Cohen | H02M 3/33592 363/21.14 |
| 8,218,340 B2* | 7/2012 | Sato | H02M 1/08 323/303 |
| 2010/0110732 A1* | 5/2010 | Moyer | H02M 3/33592 363/19 |
| 2015/0249398 A1* | 9/2015 | Halberstadt | H02M 3/33592 363/21.14 |

FOREIGN PATENT DOCUMENTS

WO  WO-2007/049195 A2  5/2007

OTHER PUBLICATIONS

Green Chip Synchronous Rectifier Controller TEA1892TS; Product Data Sheet; pp. 1-13; Rev 1-9; Apr. 9, 2014.
MPS Fast Turn-Off Intelligent Controller MP6901; The Future of Analog IC Technology; pp. 1-12; 2016.
Secondary Side Synchronous Rectification Driver for High Efficiency SMPS Topologies; NCP4305; pp. 1-52; Jun. 2016.
UCC24610 Green Rectifier TM Controller Device; Texas Instruments; pp. 1-41; Aug. 2010.
Acker, Brian et al; "Synchronous rectification with adaptive timing control"; IEEE Power Electronics Specialists Conference, Atlanta, GA, US, vol. 1; pp. 88-95 (Jun. 18, 1995).

* cited by examiner

Primary Examiner — Matthew Nguyen

(57) ABSTRACT

Disclosed is a method to control the synchronous rectification in a power converter including a primary winding and a secondary winding, including detecting a peak current in a secondary winding, determining a blanking threshold based on the peak current, and blanking a turning off of a synchronous rectifier (SR) switch for a blanking time based on the blanking threshold.

18 Claims, 7 Drawing Sheets

SYNCHRONOUS RECTIFIER

TECHNICAL FIELD

Embodiments described herein include an apparatus and a method for driving a synchronous rectification (SR) switch in a flyback converter with minimum switching losses and no reverse current, and to an SR controller that incorporates a blanking circuit to avoid early turn-off of the SR switch due to ringing in the current.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments described herein relate to a method to control synchronous rectification in a power converter including a primary winding and a secondary winding including detecting a peak current in a secondary winding, determining a blanking threshold based on the peak current, and blanking a turning off of a synchronous rectifier (SR) switch for a blanking time based on the blanking threshold.

Determining a blanking threshold may include sensing a drain to source voltage of a switch connected in series with the secondary winding, and charging the gate voltage of the SR switch until the sensed drain to source voltage reaches a predetermined regulation level.

The gate voltage may have a monotonic relation with the peak current when the drain to source voltage is regulated to a constant level.

The peak current related signal may be obtained by measuring the gate voltage with a constant and regulated drain to source voltage.

The blanking time may be a function of the peak current where the blanking time gradually increases with the peak current.

The blanking time may be zero for low peak currents. The zero blanking time may be applied for a SR gate voltage just above the threshold of a logic level FET in low voltage applications and for a SR gate voltage just above the threshold of a standard level FET in high voltage applications.

The blanking time may be zero for SR switch turn-on by low frequency ringing between the end of a secondary stroke and the beginning of a next primary stroke.

Blanking the turning off of the SR switch may include charging a capacitor, and outputting a blanking signal for an increasing duration based on the charging level of the capacitor. The method may further include stopping the blanking signal when a capacitor voltage equals the regulated gate voltage. One could also compare a scaled version of the gate voltage to a scaled internal capacitor ramp voltage.

A blanking signal may be turned off when the blanking time corresponds to the blanking threshold.

Various embodiments described herein relate to a power converter, including a secondary current winding having a peak current, a synchronous rectifier (SR) switch to rectify current in the secondary winding, the SR switch having a source, drain and gate, an SR controller to control the SR switch, the SR controller including a peak current detector configured to produce an output signal related to the peak current value of a secondary current, and a blanking circuit configured to set a blanking time based upon the output gate signal related to the peak current value.

The peak current may be obtained by measuring a drain to source voltage of the SR switch with the SR gate charged such that a defined VDS voltage is reached.

The blanking time may be a function of the peak current and where the blanking time gradually increases with the peak current.

Various embodiments described herein may also relate to a power converter including a secondary winding having a peak current, a synchronous rectifier (SR) switch to rectify current in the secondary winding, an SR controller to control the SR switch, the SR controller including a detecting circuit to detect a peak current in the secondary winding, regulation circuitry to determine a blanking time based on the peak current, and a blanking circuit to blank the SR switch for the blanking time.

The blanking circuit includes a current source to power a current loop, the current loop including a resistor and a capacitor, and a comparator block to compare a charge level of the capacitor to the gate voltage.

The blanking time may be defined by a value of the resistor multiplied by a value of the capacitor.

The blanking time may be independent of a converter output voltage and controller supply voltage.

The blanking circuit may include an input to represent a representation of the peak current of the SR switch, and a latching component to output a blanking signal that prevents ringing in the current of the secondary winding from interfering with gate switching of the SR switch.

Blanking the SR switch may include charging a capacitor, and outputting a blanking signal for an increasing duration based on the charging level of the capacitor.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Embodiments described herein include an apparatus and a method for driving a synchronous rectification (SR) switch in a flyback converter with minimum switching losses and no reverse current. SR controllers incorporate a blanking circuit that avoids early turn-off of the SR switch due to ringing in the current. Blanking is a function that disables a control block during a limited time wherein input signals are not valid, and may be referred to as a blanking time. Embodiments described herein scale the blanking time in proportion to a peak level of a secondary current from a secondary winding and operate without external components, thus keeping packaging small. According to embodiments described herein, for a high peak current resulting in a large amount of ringing in an SR switch, the blanking time may be set at its highest setting and avoid early or temporary turn-off, which would otherwise lead to less efficiency. For medium peak current with medium ringing, the blanking time may be held at an intermediate setting to avoid reverse current. For short current pulses with low ringing, turn on can be without blanking and the SR switch can be turned off directly.

For switched mode power supply (SMPS) converters used in adapters and power converters, size and efficiency are very important. A smaller converter with high output power may need high efficiency in order to keep the component temperature and packaging temperature low.

Blanking is widely used in the control blocks of SMPSs, for example in voltage sense comparators and voltage sense regulators. These comparators and regulators may act on low frequency SMPS signals and not on high frequency ringing and transient effects. The blanking function takes care that the comparators and regulators are active when input signals are valid SMPS signals and do not react on the high frequency ringing and transient effects.

Efficiency may be increased by applying synchronous rectification at the AC to DC output stage of a SMPS converter such as a flyback converter. An ideal efficiency improvement with respect to rectification by diodes is a diode voltage divided by the output voltage. The efficiency loss of using a Schottky diode as a rectifier may be on the order of 0.3/5.0 volts, or six percent. The forward voltage of a Schottky diode is depending on temperature and current density and can be in a practical range from 0.2V to 0.5V. Use of an SR switch may eliminate this typical six percent power loss for a converter with a 5V output voltage.

Figure 1:
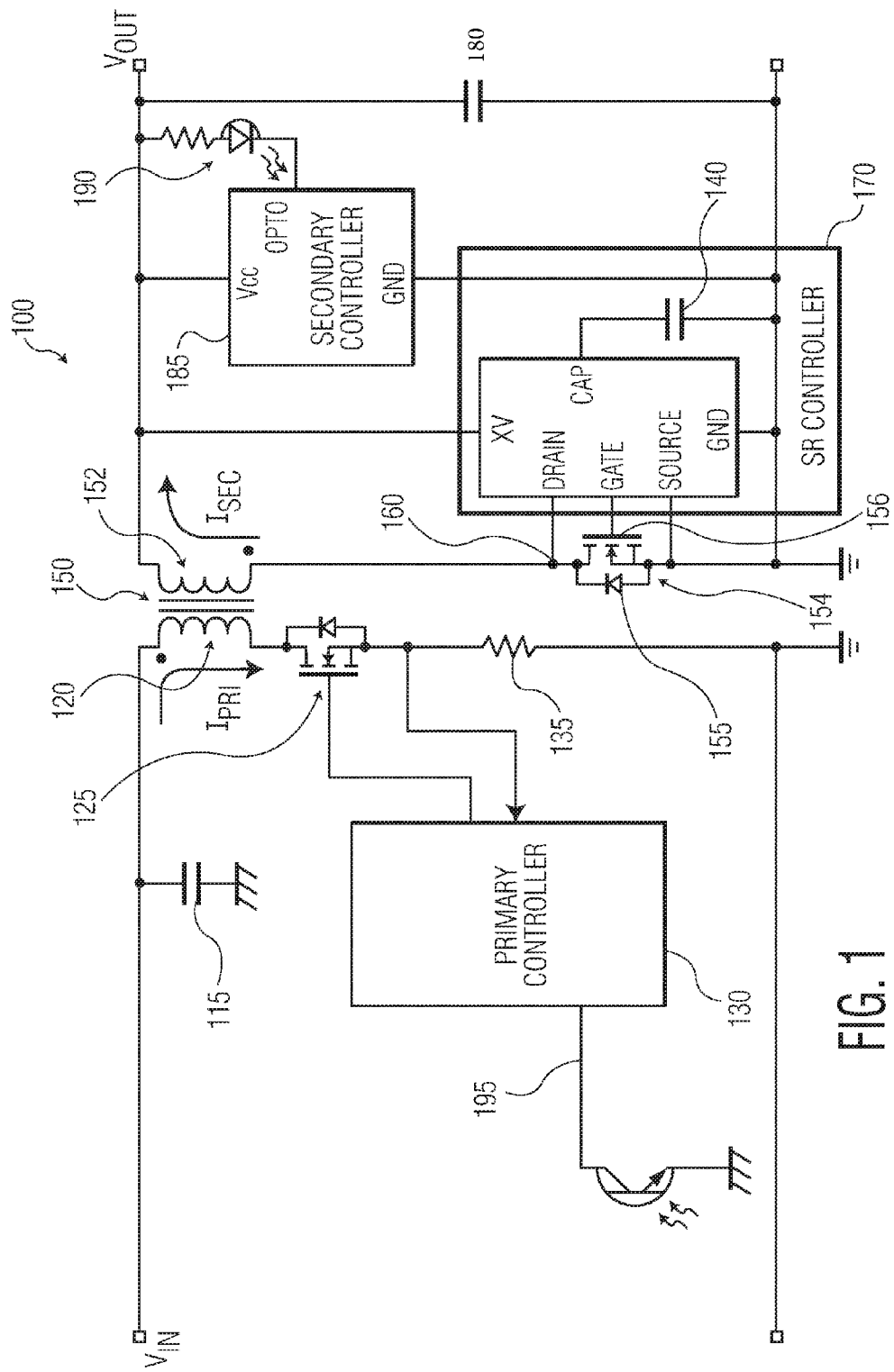
FIG. 1 illustrates a flyback converter with synchronous rectification in accordance with embodiments described herein.

FIG. 1 illustrates a flyback converter 100 with synchronous rectification in accordance with embodiments described herein. The flyback converter 100 converts a rectified mains voltage into a regulated and mains-isolated DC voltage. The rectified mains voltage $V_{IN}$ is stored in a capacitor 115. This high DC voltage $V_{IN}$ is the input voltage of the flyback converter 100. The input or primary side includes a primary coil 120 and a primary switch 125. When this primary switch 125 is turned on, primary current ($I_{PRI}$) in the coil 120 increases with a slope equal to the rectified input DC voltage $V_{IN}$ divided by the primary inductance. The current ($I_{SEC}$) in a secondary coil 152 remains zero during what is known as the primary stroke because an SR switch 154 on the secondary side does not conduct. A primary controller 130 defines the end of the primary stroke by monitoring $I_{PRI}$ in coil 120 via a sense resistor 135 and turns off the primary switch 125 at a desired peak $I_{PRI}$.

The energy stored in the transformer 150 (primary coil 120 and secondary coil 152 are magnetically coupled with minimum leakage) is then transferred to the secondary side of the flyback converter 100 and $I_{SEC}$ starts flowing with a peak $I_{SEC}$ equal to $I_{PRI}$ multiplied with the transformer 150 turns ratio. The SR switch 154 detects the peak $I_{SEC}$ and turns on. $I_{SEC}$ flows to the output capacitor 180 and to a load if connected. $I_{SEC}$ decays to zero with a slope equal to the output capacitor voltage divided by the secondary inductance of the secondary coil 152. The output voltage $V_{OUT}$ is regulated with feedback by a secondary controller 185. A feedback signal is sent to the primary controller 130 to regulate the power sent by the primary side of the flyback converter 100. This feedback signal has to cross the mains-isolation and is therefore usually made in the optical domain by using an opto-coupler 190 output to a control input 195 of the primary controller 130.

$I_{SEC}$ in a flyback converter may start with large ringing. This ringing on $I_{SEC}$ of the flyback converter may be caused by the leakage inductance and the parasitic capacitance on the switching node. When the conduction phase of an SR MOSFET switch 154 is initiated, current will start flowing through a body diode 155, generating a negative drain to source voltage ($V_{DS}$) across it. The body diode 155 will have a higher voltage drop than the one caused by the MOSFET on resistance ($R_{ON}$). An SR controller 170 in accordance with embodiments described herein may regulate the gate 156 of the SR MOSFET to a level such that a constant $V_{DS}$ across this MOSFET may be maintained from the moment the drain becomes negative. This is because the gate 156 of the SR MOSFET 154 is not switched on by a switch during an initial waiting time, but is switched on by a voltage regulator. The voltage regulator regulates the gate voltage to a level, such that the $V_{DS}$ voltage is at a certain level. Because the gate voltage depends on the size of $I_{SEC}$, this can be used to adjust the blanking time.

When there is substantial ringing of the current, the gate voltage regulator may not react to the ringing, because it would lead to repetitive charging and discharging of the gate of the MOSFET 154 by the SR controller 170, leading to unwanted additional gate drive losses, degrading the efficiency. The SR switch 154 may include a large transistor with a large gate capacitance, on the order of 10 nF. Charging and discharging this gate requires energy, and therefore the desire is to not charge it more than needed and avoid multiple charge and discharge cycles.

In SR controllers a blanking function with a fixed time period has been incorporated that enables the SR controller to not react to ringing. A blanking function may avoid early turn off of an SR switch by disabling a discharge regulator of the SR controller for a defined time slot at the start of the secondary stroke.

Figure 2A:
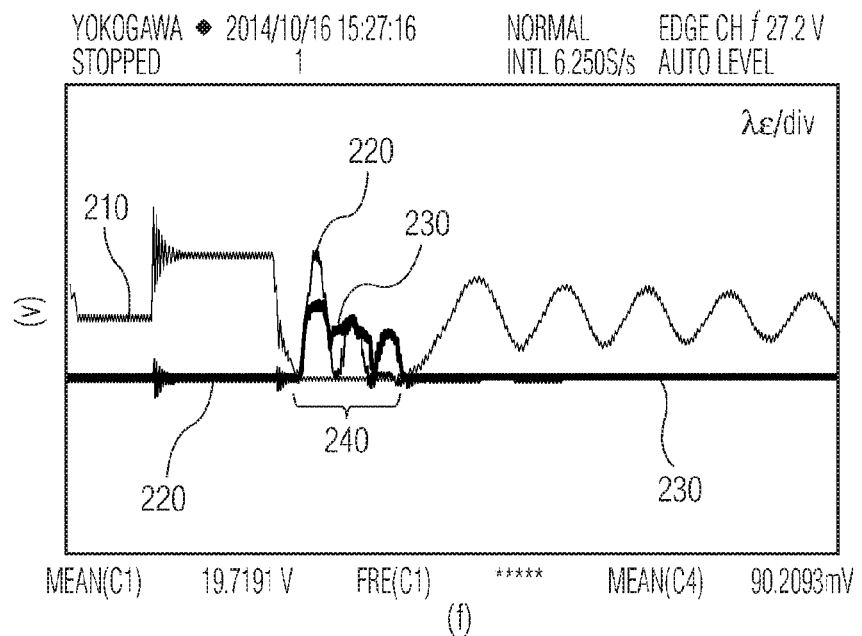
FIG. 2A illustrates an SR controller without blanking in a low power condition in accordance with embodiments described herein.

FIG. 2A illustrates waveforms present in an SR controller without blanking in a low power condition. FIG. 2A illustrates three wave forms. The waveform 210 represents $V_{DS}$ of an SR switch. The waveform 220 represents the drain to source current, which is $I_{SEC}$ through the secondary winding 152. The waveform 230 represents the gate voltage. This is an example of when there is too short blanking, or zero blanking. Because of leakage inductance in a secondary winding, which is always present in switched mode power supplies, there is a ringing in the current, such as illustrated at 240 that gets reflected in the gate voltage 230. The gate voltage waveform 230 gets charged and discharged for multiple cycles. In this case, the gate voltage also rings following the ringing of the current.

Figure 2B:
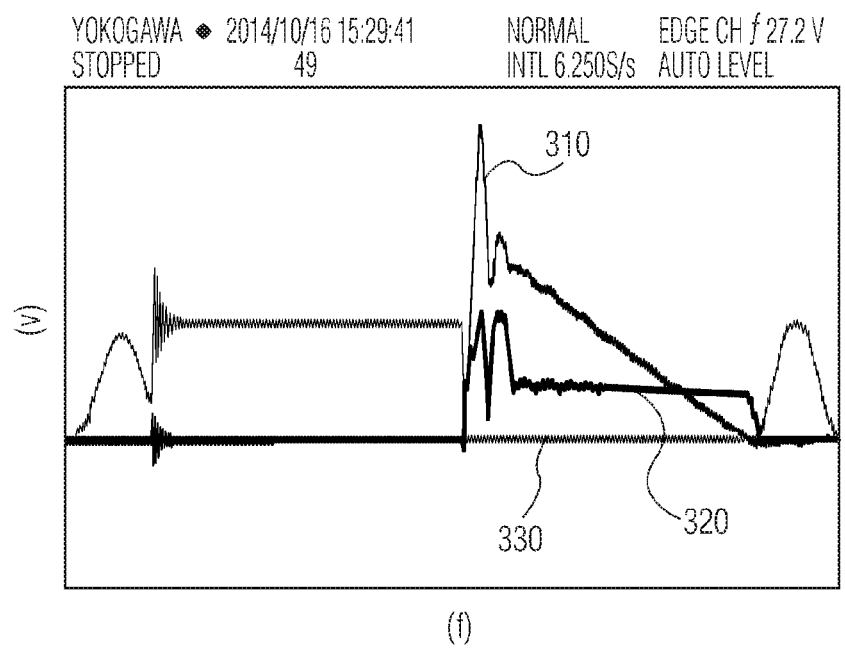
FIG. 2B illustrates an SR controller without blanking in a medium power condition in accordance with embodiments described herein.

FIG. 2B illustrates an SR controller without blanking in a medium power condition. In FIG. 2B, the current 310 is larger, and the gate voltage 320 increases to a maximum, then decreases to a minimum, and increases again and decreases again, which should be avoided, because the ringing of the gate causes switching losses.

Embodiments described herein offer a way to turn on the gate 156 of the SR switch 154 and keep it on, or turn off the gate 156 and keep it off, during an entire cycle of the transformer. Using the current amplitude spikes 310, a blanking time can be adapted to be on during these spikes.

In addition to early turn-off of the SR switch 154 causing an issue, turning off the SR switch 154 too late may cause an unwanted reverse current. This reverse current may discharge an output capacitor 158 and transfer energy back from the output capacitor 158 to a transformer 150 with a loss of efficiency. When the SR switch 154 eventually turns off with reverse current flowing through the secondary winding 152 of the transformer, a large voltage peak will be generated on the drain 160 of the SR switch 154. This high voltage peak would normally require the use of an SR switch with a higher voltage rating and therefore higher cost. The blanking may end sufficiently earlier than the moment the secondary current reaches zero level.

The issue with too long blanking can occur in two conditions. One condition may be in a low power mode with a small primary peak current and a short secondary stroke. A second condition may be in the valley of the drain voltage during low frequency ringing that may cause a short negative drain-source voltage on the SR switch which results in the turn-on of the SR switch. In FIG. 2B the valley of the drain voltage 330 during low frequency ringing touches the ground level and can easily turn on the SR switch 154.

Embodiments described herein include an SR controller 170 that may be used in various packages with an adaptive gate drive and adaptive blanking. Amplifier control of the adaptive gate drive may generate a high SR gate voltage to correspond to high peak current in the secondary winding 152 and a low SR gate voltage to correspond to low peak current in the secondary winding 152.

Figure 3A:
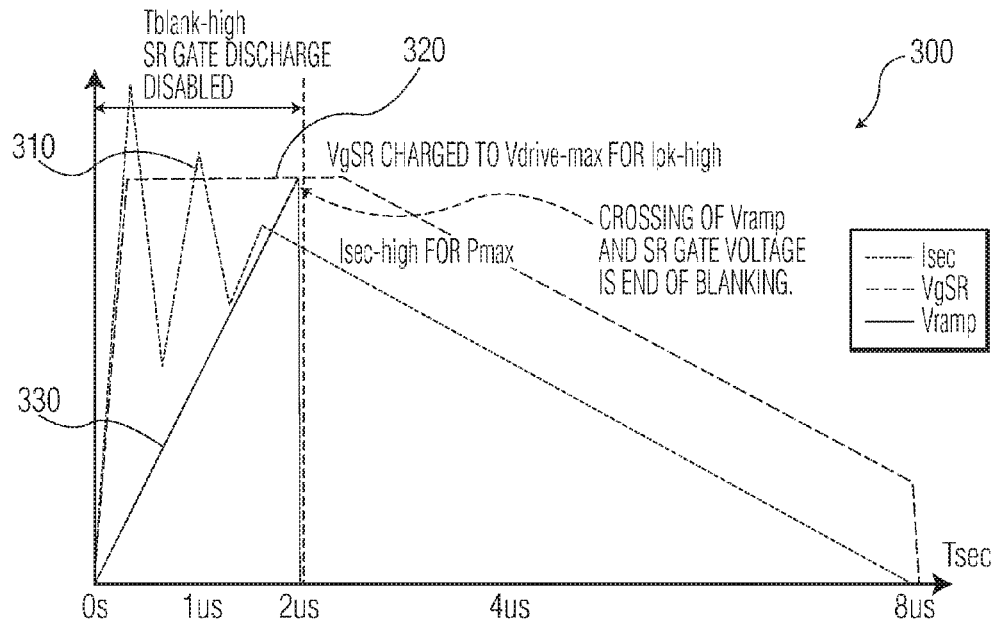
FIGS. 3A and 3B illustrate graphs of SR gate voltage and blanking time for high and low secondary winding peak currents in accordance with embodiments described herein.
Figure 3B:
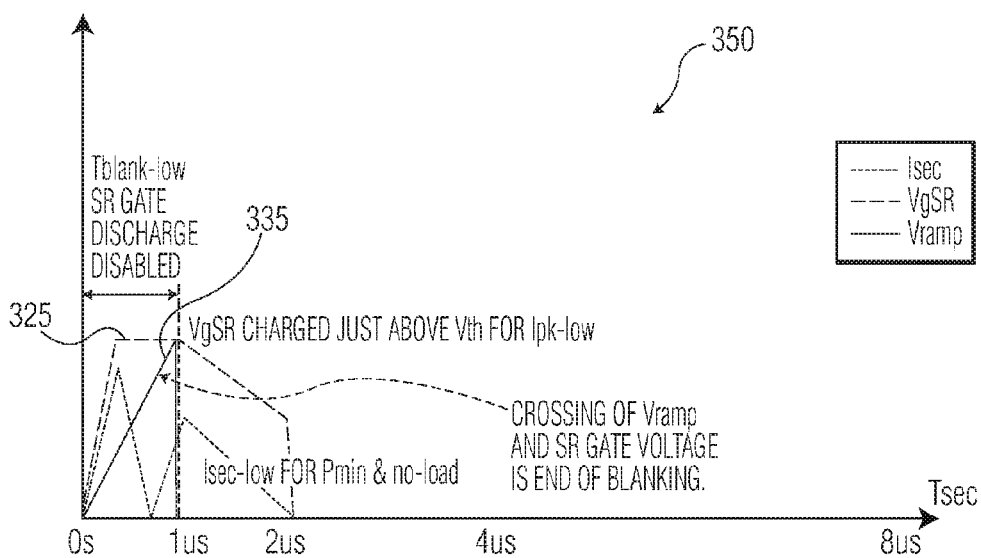

FIGS. 3A and 3B illustrate an SR gate voltage and blanking time for high 300 and low 350 secondary peak currents in accordance with embodiments described herein. In FIG. 3A, the waveform 310 illustrates the current in the secondary winding with ringing. The waveform 320 represents the SR gate voltage charged to a high level and the ramp waveform 330 may be used to determine the blanking time.

The waveform 310 represents a secondary current that may be rectified and includes ringing. Referring to the topology of FIG. 1, in order to set a blanking time to minimize the effect of the ringing, the gate 156 may be driven to a maximum level and regulated at the maximum level. If the current decreases, such as after a time of 2 µs, then the gate voltage $V_{GS}$ may decrease with the current level. Between about 0 and 2 µs, the time of the ringing, the gate voltage should be held relatively constant, and without discharging of the gate as a result of the ringing.

The voltage drop $V_{DS}$ of the SR switch 154 may be sensed by measuring the voltage drop of the drain source channel. The voltage drop of the drain source channel will be regulated by varying gate voltage of the SR switch 154. If the current in the secondary winding 152 is high, the voltage drop of the drain source channel will be high and the gate voltage of the SR switch may increase in order to regulate the voltage drop of the drain source channel to a constant level.

In FIG. 3B, for rectification of lower current, low current and ringing can occur in no loads or in low power conditions. Again referring to FIG. 1, the secondary winding 152 current may be less and the amplifier control of the SR controller 170 may charge the gate 156 of the SR switch 154 to a lower level, just above a threshold, in order to save switching losses. The SR switch 154 may be a large transistor with a large gate capacitance, on the order of 10 nF.

Charging and discharging the gate 156 uses energy, and therefore in embodiments described herein the gate 156 may not be charged more than needed nor should there be multiple charge and discharge cycles. A method of operation includes measuring the $V_{DS}$ to regulate the gate voltage ($V_{GS}$). By keeping $V_{DS}$ to a desired level, $V_{GS}$ of the SR switch can be matched in proportion to the current through the secondary winding. Therefore a high gate voltage will be set for a high current, and a low gate voltage will be set for a low current.

As illustrated in FIGS. 3A and 3B, the waveform 330 is the blanking ramp. If a high gate voltage is to be set, there is a ringing current and there may be a desire to blank the SR switch 154 for a longer time. This may be accomplished by turning on the SR switch 154 and internally within the SR controller 170, as the time starts, starting the ramp voltage 330 at 0V. Once the ramp voltage 330 reaches the gate voltage 320, the blanking stops. In the upper graph 3A, for example, the blanking stops at 2 µs, in the lower graph 3B the blanking stops at 800 ns.

The level of the drain current $I_{SEC}$ may be undetermined before the SR switch 154 is turned on. If the current level becomes high, then the gate voltage waveform 320 in FIG. 3A will be set high, and the blanking ramp 330 may use more time to reach and cross the gate voltage 320 to end the blanking time. In FIG. 3B, the slope of the blanking ramp 335 is the same. Because the gate charge level 325 is lower, the crossing of the ramp 335 and the gate line 325 is earlier, at 800 ns, which results in a shorter blanking time.

Embodiments described herein thus provide a solution to an issue of too short blanking that cause additional gate drive losses, or too long blanking, that gives reverse current and overvoltage spikes on the drain.

After the crossing of the internal ramp signal 330 and the SR gate voltage 320 the blanking of the pull down regulator may end. The gate 156 may be gradually discharged in proportion with decaying $I_{SEC}$ when $I_{SEC}$ drops below a value where the $V_{DS}$ regulator comes into regulation again at a $V_{DS}$ equal to the regulation level.

Figure 4:
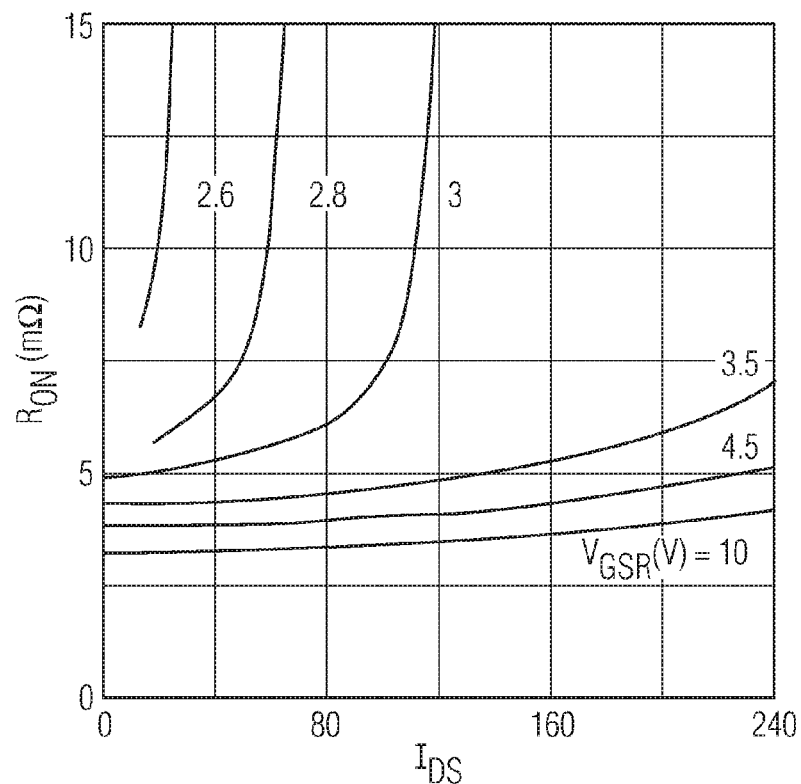
FIG. 4 illustrates $R_{ON}$ as a function of $V_{GS}$ and $I_{DS}$ of a rectifier controller in accordance with embodiments described herein.

FIG. 4 illustrates on resistance $R_{ON}$ as a function of $V_{GS}$ and $I_{DS}$ of a rectifier switch in accordance with embodiments described herein. Embodiments described herein may use $V_{DS}$ of an SR switch to determine the gate voltage $V_{GS}$ of which to set the SR switch 154. FIG. 4 illustrates $R_{ON}$ for different $V_{GS}$ levels of a commonly used 60V 5 mΩ logic level SR switch. This SR switch may be applied for peak secondary currents up to 20 A and may operate in the ohmic or linear region (bottom left side of FIG. 4) and will not enter the saturation region.

The $V_{GS}$ of an SR switch may be determined when ($V_{DS}$) is at a regulation level and $V_{GS}$ may be set proportional to the $I_{SEC}$ with a non-linear but monotonic relation. The gate peak voltage $V_{GS}$ to be set for an SR switch may operate in a range from a threshold voltage to the SR controller 170 supply voltage and may carry the information of the $I_{SEC}$ that will be used to determine the blanking time.

Referring to FIG. 1, the SR switch 154, a peak current level may be determined from the current of the secondary winding $I_{SEC}$. $V_{DS}$ may be sensed by the SR controller 170, and then regulated by the SR controller 170 to a predetermined level by changing the gate voltage of the SR switch.

For example, if $I_{SEC}$ is 10 A, and the $V_{DS}$ is sensed at a level near 30 mV and then regulated at 30 mV, then $R_{ON}$ will be 3 mΩ, which may correspond to an SR switch 154 being operated with a maximum $V_{GS}$ of 10V. If the $I_{SEC}$ is for example, 5 A, and the $V_{DS}$ is sensed and regulated at 30 mV, then $R_{ON}$ is determined to be 6 mΩ, and an SR switch 154 can be regulated back to a $V_{GS}$ of about 5V. Another example, if a low $I_{SEC}$ of 1 Amp is sensed, at a $V_{DS}$ of 30 mV, the $R_{ON}$ may become 30 mΩ, and the $V_{GS}$ may become 2V, which may be just above the threshold voltage of an SR switch. The SR controller 170 works in the voltage domain. $V_{DS}$ is sensed and regulated to a constant level by varying the $V_{GS}$.

$I_{SEC}$ may be defined by the application. $V_{DS}$ may be kept constant, for example 20 mV, 30 mV or 40 mV (below a typical 300 mV forward voltage of a Schottky diode for obtaining gain in efficiency). If $I_{SEC}$ drops, the SR switch may operate at a higher $R_{ON}$ and $V_{GS}$ may be changed to a lower level. If $I_{SEC}$ increases, a lower $R_{ON}$ is needed and $V_{GS}$ may be increased by the SR controller 170. This setting of different $V_{GS}$ levels may be one portion of the adaptive blanking of embodiments described herein.

The $V_{GS}$ level that gradually increases with secondary current may be used to set the blanking time. For high peak current, $V_{GS}$ and the blanking time may be at a maximum. For low to medium peak currents $V_{GS}$ and the blanking time may have a medium value. For turning on in the valley of the ringing, $V_{GS}$ may be just above the threshold and the blanking time may be zero.

$I_{SEC}$ may determine the secondary stroke time of the flyback converter 100 because the transformer inductance is constant and the output voltage is regulated to a constant level. The blanking time should be smaller than the secondary stroke time. The blanking time may end before the secondary current becomes zero again.

Figure 5:
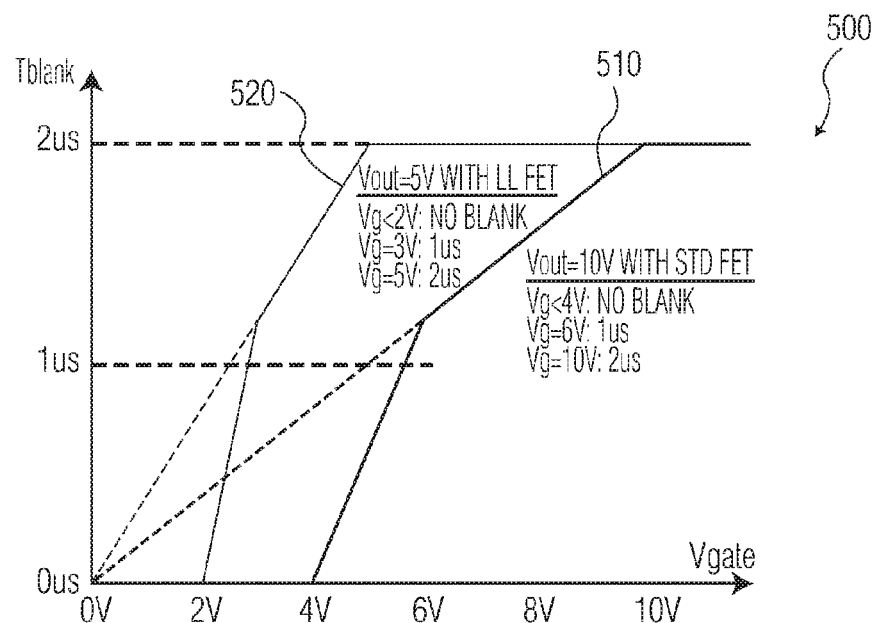
FIG. 5 illustrates blanking time as a function of the SR gate voltage for 5V and 10V output voltage in accordance with embodiments described herein.

FIG. 5 illustrates blanking time as a function of the SR gate voltage for 5V and 10V supply voltage in accordance with embodiments described herein. FIG. 5 illustrates a transfer function between blanking time and gate voltage. $V_{GS}$ may scale with the $I_{SEC}$. If $I_{SEC}$ is large, $V_{GS}$ will be large, as indicated by the waveform 510. If there is resonant ringing after the secondary current has become zero, $I_{SEC}$ will be low and the SR switch 154 could be turned on to a level just above the threshold, this can be about 2V for a logic level (LL) FET. For a standard level FET $V_{GS}$ can be about 4V. In such a case the blanking time may be zero, and there can be an offset. For very low $V_{GS}$ levels, the blanking time may be zero. As illustrated in FIG. 5, for low levels of $V_{GS}$, the values need not cross the 0,0 origin. An offset threshold may be set.

$V_{GS}$ may be increased to a level when the $R_{GS}$, multiplied with the $I_{SEC}$ equals the regulation level ($R_{ON}*I_{SEC}=V_{REG}$) or to the maximum $V_{GS}$, which is equal to the supply voltage. $I_{SEC}$ may have a saw tooth waveform and therefore $V_{GS}$ will rise rapidly and faster than the ramp for the blanking.

For very small currents the SR switch 154 may be turned off directly without a blanking time. For large currents, adaptive blanking may be used. For maximum currents, a maximum time may be set.

As illustrated in FIG. 5, the gate voltage may be dependent upon the type of FET being used. For 5 volt applications, which may be a standard voltage for battery charging, a Logic Level (LL) FET may be used having a maximum of 5V at the gate. The system may be used for other application/converter output voltages such as 9V, 12V, 15V or 20V.

For high voltages, a standard level FET may be used, with higher threshold voltage. With a standard level FET the system would need a gate voltage of typically 10V for minimum $R_{ON}$.

The gate voltage of an SR switch 154 may be set by the SR controller 170 and the blanking time may have a relationship with at least the secondary winding or drain current $I_{SEC}$, the switch 154 on-resistance $R_{ON}$, and the drain to source voltage $V_{DS}$ as discussed herein. If $I_{SEC}$ is low, $V_{GS}$ will be low, and the blanking can be very low or even zero.

The different values illustrated in FIG. 5 may be built into the SR controller, and may be detected from the output voltage $V_{GS}$. For example for a Logic Level FET having a $V_{OUT}$ of 5V, if a $V_{GS}$ is determined to be <2V, no blanking time may occur. If $V_{GS}$=3V, a blanking time may last for about 1 μs, and if $V_{GS}$=5V, a blanking time may last for about 2 μs. For a standard FET with a maximum $V_{OUT}$ of 10V, if $V_{GS}$<4V, no blanking time may occur. If $V_{GS}$=6V, a blanking time may last for about 1 μs, and if $V_{GS}$=10V, a blanking time may last for about 2 μs.

Figure 6:
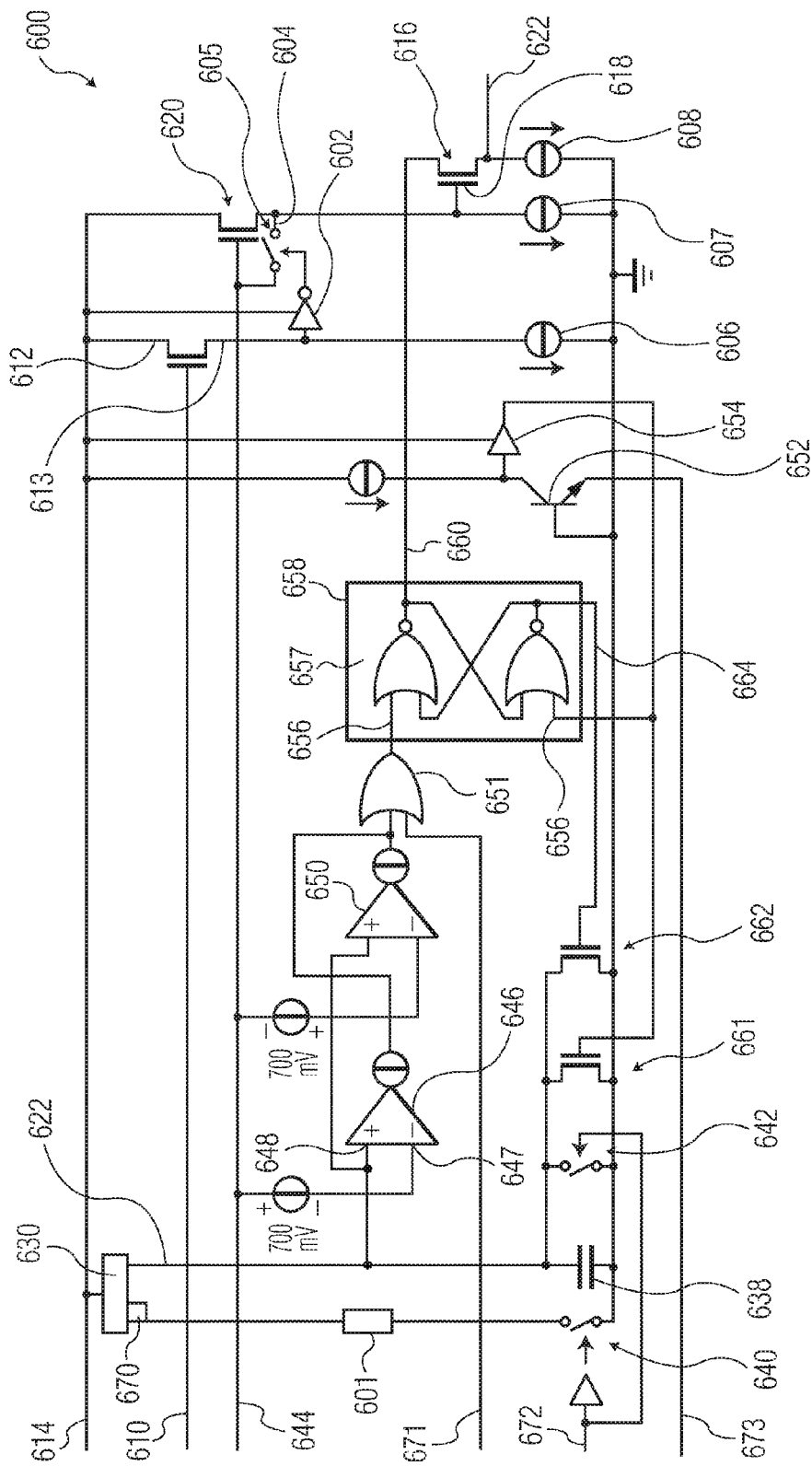
FIG. 6 illustrates an implementation of adaptive blanking in accordance with embodiments described herein.

FIG. 6 illustrates an implementation of an adaptive blanking circuit 600 in accordance with embodiments described herein.

The adaptive blanking circuit 600 may include a power supply 614. The power supply 614 may be 5V, 10V, 12V, depending on the application. The power supply 614 may supply power to a current source 630 which may in turn use a current mirror 670 to establish proportional current in two branches of a charge loop 622. The charge loop 622 may include a resistor 601 and an internal capacitor 638 that is charged during blanking. The internal capacitor may be in parallel with a switch 642, transistor 661, and transistor 662. The power supply may provide a reference voltage to PMOS transistor 612 and NMOS transistor 620.

The adaptive blanking circuit 600 may include a 4.5V reference voltage 610. The reference voltage 610 may be the gate input of a PMOS transistor 612. The adaptive blanking circuit 600 may include a reference input 644 of the SR switch gate voltage $V_{GS}$. The $V_{GS}$ 644 in the adaptive blanking circuit 600 may be used as a reference voltage by comparator 646 and by comparator 650 to determine when the blanking should end.

The charge loop 622 may include the resistor 601 and capacitor 638, which may produce varied time constants for charging the capacitor 638 based on the values selected for these components. The resistor 602 may define the charge current, and the capacitor 638 may accumulate the charge. Using a higher supply voltage 614, the charge current may also increase, and $V_{GS}$ may also increase.

For example, if the supply voltage is 5V, Logic Level FETS may be used in the adaptive blanking circuit 600. The adaptive blanking circuit 600 may be tuned to a 5V maximum value and the blanking current to charge the capacitor 638 may be defined by 5V divided by the resistor 602, and charged to 5V. If the supply voltage is 12V, $V_{GS}$ 644 can be tuned to a maximum of 12 V and the charge current defined by the resistor 601 may be larger, 12V/resistor 601, and the capacitor 638 may be charged to a higher voltage. Because charging current is proportional to supply voltage, the blanking time may be defined by the RC combination, the value of the resistor 601 multiplied by the value of the capacitor 638, and the timing may be independent of the supply voltage. As illustrated in FIG. 5, the max blanking time of 2 μs may be defined by R and C, and not by the supply.

The values of R and C may define the blanking time as illustrated in FIG. 5 by lines 510 and 520 having different slopes. The first line 510 is the voltage on the capacitor, so at 0 seconds, the SR switch is turned on, and the capacitor is discharged and starts being charged.

In FIG. 6, a switch 642 can make a short circuit over the capacitor 638. If the SR switch is turned on, the capacitor 638 voltage may increase by the slope defined by R and C. The voltage on the capacitor 638 may be monitored by both comparators 646 and 650. When a capacitor voltage at pin 648 is equal to the gate voltage $V_{GS}$ at pin 647, then a blanking time has finished. The comparator 646 output changes to a one. The comparator 646 output is input to OR gate 651. This one is input to the Reset pin of latch 658, which outputs a zero signal at 660, representing the state of the blanking signal as off. The latch 658 may be a memory circuit component that stores one bit of memory.

Thus when the capacitor 638 voltage equals $V_{GS}$, the capacitor 638 may be discharged, and a blanking signal may be turned off. This may be known as adaptive blanking. If $V_{GS}$ is set higher, the capacitor voltage 648 will reach the gate voltage 647 later. If $V_{GS}$ is set lower, the capacitor voltage 648 will reach the gate voltage 647 sooner.

In a primary stroke of the flyback converter, the capacitor 638 may be discharged. At the start of a secondary stroke the sensed $V_{DS}$ may drop to a negative diode voltage and this level may set the logic_blank latch 658. The latch switches off transistor 662, but transistor 661 still keeps the voltage on capacitor 638 low until after $V_{DS}$ rises again when the SR switch turns on. After this the capacitor 638 begins charging.

The Q output 660 of the latch 658 is high during the blanking period and is the supply voltage for source follower 616. The blanking signal is the output of this source follower. The input of this follower is the gate voltage of the SR power switch, or it is one threshold voltage lower. At the moment that the capacitor 638 voltage equals the gate voltage 644 of the SR switch, the logic_blank latch 658 may be reset and the blank output 622 may become zero.

The digital blanking signal 660 may pass a source follower stage of transistor 616 for making the blanking zero for low gate voltage and low current pulses in two scenarios. For a 5V output voltage and Logic Level FETs $V_{GS}$ may be higher than two thresholds of an internal MOS transistor to pass the blank signal to the off regulation driver of the SR switch 154. For 10V output voltage and standard level FETs the gate voltage needs to be higher than three thresholds of an internal MOS transistor for passing the blank signal to the off regulation driver of the SR switch 154.

Current sources 606, 607 and 608 respectively bias the PMOS 612, NMOS 620 and NMOS 616. The PMOS 612 may detect if the power supply 614 is 5V or if the supply 614 is larger than 5V. The gate of PMOS 612 may be connected to 4.5V at connection 610. When the power supply 614 is at 5V or less, the voltage difference between the 5V supply and the 4.5V 610 of the PMOS gate 612 does not exceed a threshold of 0.7V, and the PMOS 612 does not conduct. The drain is pulled to ground by the current source 606 and the inverter 602 input is low. A low input to inverter 602 sends a high signal to switch 604 that closes the switch. $V_{GS}$ then becomes the input of source follower 616. If $V_{GS}$ is higher than the threshold of NMOS 616 and if the Q output 660 of the latch 658 is high, then the blanking NMOS 616 will be turned on and passes a blanking signal 622 to the turn-off regulator 706 which is one threshold lower than the gate voltage of the SR switch. This voltage is put on the gate of a disable transistor in the turn-off regulator 706 that has its source connected to ground. When the gate voltage of the SR switch is more than two thresholds of an internal NMOS transistor this disable transistor begins disabling the turn-off regulator 706.

When the power supply 614 is on the order of 10V or higher, the voltage difference between the 10V or high supply and the 4.5V 610 of the PMOS gate 612 exceeds 0.7V, the PMOS 612 conducts. The drain of the PMOS 612 is pulled up to the driver supply and the inverter 602 input is high. When the input is high, the inverter 602 switches off the switch 604 and NMOS 620 will conduct the current of bias source 607.

If $V_{GS}$ is higher than three thresholds, namely first threshold of NMOS 620, a second threshold of NMOS 616 and the threshold voltage of the disable transistor in turn-off regulator 706 and if the Q output 660 of the latch 658 is high, then the blanking NMOS 616 will be turned on and passes a blanking signal 622 to the turn-off regulator 706.

The transistor 616 is a source follower that may be set with one or two thresholds and there may be a switching action that looks toward the supply voltage. If the supply voltage is 5V or lower, then two thresholds making for example 2V may apply, and if the supply voltage is greater than 5V, three thresholds making 3V for example may apply.

Both comparators 646 and 650 determine the end of the blanking time. Comparator 646 is not active at very low gate voltages and comparator 650 is not active at very high gate voltages. The outputs of the comparators 646 and 650 are connected to OR gate 651 so that together they are active over the entire supply voltage range.

The system may include offsets to manage the sensing done by the comparators. In an example implementation, when the gate voltage is at the supply voltage and the capacitor voltage reaches the supply voltage, the comparator cannot make a decision, unless it is given a deliberate offset. Another possibility to enable the comparator to make a decision in this case is to compare the capacitor voltage to a voltage that is for example about 100 mV lower than the real gate voltage. This applies for the comparator 646 that is only active for input voltages above a certain threshold above ground. The other comparator 650 that is active only below a certain threshold voltage below the supply voltage has to be able to make the right decision when both the gate voltage and the capacitor voltage are at ground level. This is possible by comparing the capacitor voltage with a voltage that is for example 100 mV higher than the gate voltage.

The circuit 600 may include a power on reset (POR) line 671, to define a start up level once the circuit starts. The POR 671 is normally off, to input a zero to the OR gate 651. The POR line 671 is logically high if the supply voltage line 614 is too low for correct operation of the circuit. If the supply line has a high enough voltage for good operation then the POR line 671 becomes logically low and releases the circuit for normal operation with a defined starting state.

The blanking circuit 600 may include a low voltage replica of the drain voltage input 673. As discussed herein, at the start of a secondary stroke, if the drain goes low, below ground, which may be detected by the NPN transistor 652. The input of inverter 654 is pulled low and its output sets the latch 658 of cross-coupled inverters 656 and 657. The output of the latch may generate a signal Blank that is transferred by an NMOS 616 to the output 622. If that level is high, then the blanking is active, and it stays high and active, until a reset arrives. The reset may arrive when the blanking level is maximum, and when the first comparator 646 toggles. This action is when the capacitor voltage 648 equals the gate voltage 647 minus a predetermined offset.

If the capacitor voltage 648 equals the gate voltage 647, the latch 658 may be reset and the blank signal at the output 622 becomes zero again. At the second comparator 650 there is a zero to zero comparison when both the gate voltage and the capacitor voltage are zero. At the beginning of the conduction cycle, before the SR switch is on, then the latch 658 is set. At that moment the gate voltage 648 is low, so the gate is 0 V, and the cap is 0 V, and a reset signal should not be generated. Therefore a comparator should compare the capacitor voltage in this case to a signal that is for example 100 mV larger than the gate. Thus the ramp is zero, the gate is zero, and a reset is not directly generated. A reset only happens if the ramp voltage crosses the gate voltage.

The circuit may include an energy save (ES) input signal 672, to enable some circuits to be switched off, in a sleep mode. The resistor 601 may be switched off, therefore there is no current, and the capacitor 638 may be discharged, and the circuit may start at 0V. In sleep mode, in standby situations, the circuit may not consume power, and the capacitor stays at 0V. When a charger is inserted into a wall plug without load and operating in a standby or sleep mode, the capacitor 638 may start from zero, and the latch 658 may be reset. Usually the switch 640 is closed for normal operation.

The transistors 661 and 662 may cause the discharging of the capacitor 638. After the latch is reset and latch terminal 660 becomes zero the capacitor 638 will be discharged. The output 664 of the latch 658 may be high and discharge the capacitor 638. Once a secondary stroke is started, the current flowing out of the current mirror 670 may charge the capacitor 638 and then generate the blanking ramp.

The signal 660 may be output from the latch 658, to transistor 616 and which may cause the blanking signal. If blanking signal is high, the circuit may blank and continues to accumulate charge on the capacitor 638. If the signal 660 output from the latch 658 is low, 0V, then the blanking has finished, and the SR switch 154 may be regulated/switched on or off.

In FIG. 6 as the supply 614 increases, then the current through the resistor 601 increases and then the output of the current mirror 670 may charge the capacitor 638. If the supply changes then the output current may change the same magnitude.

Figure 7:
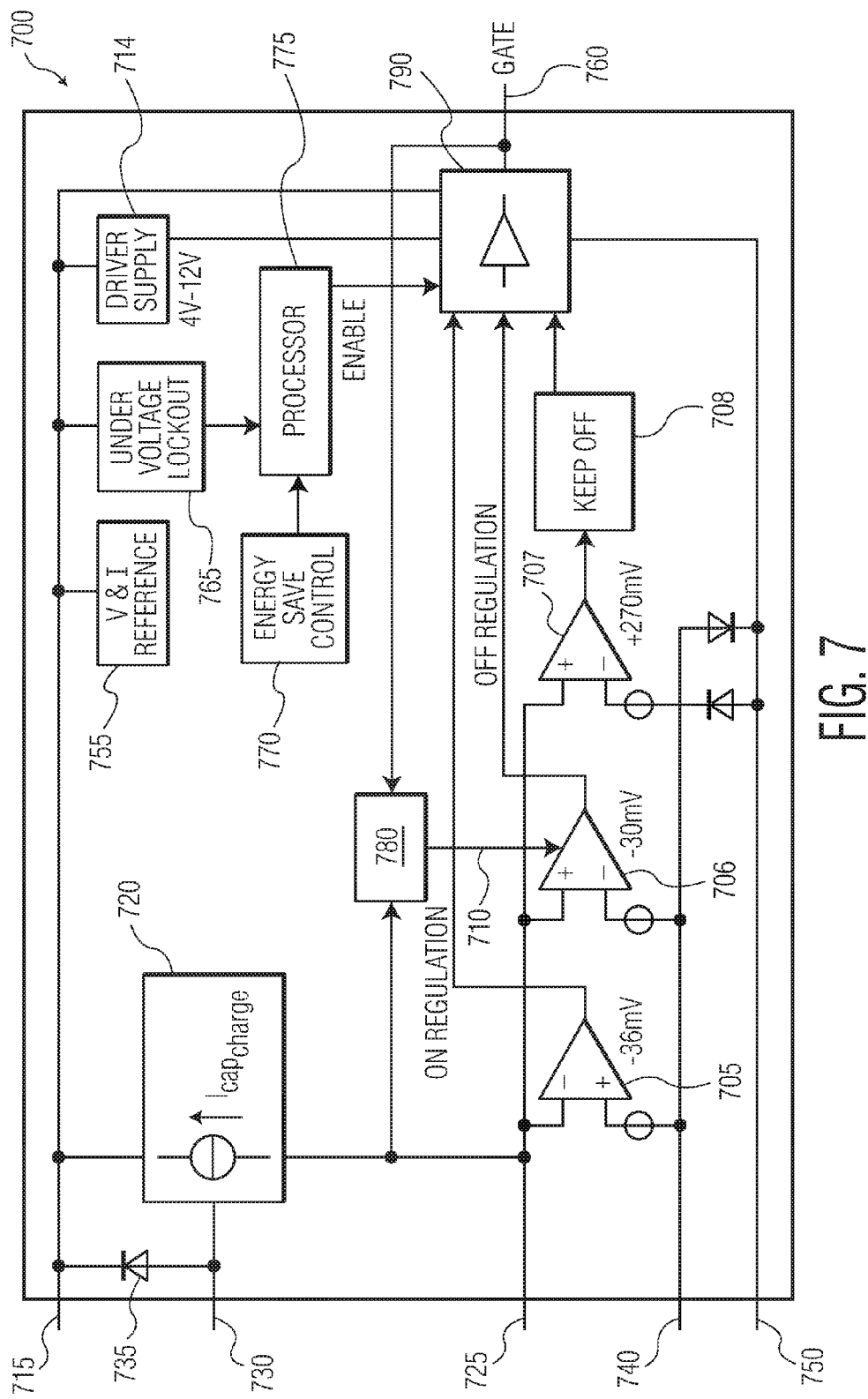
FIG. 7 illustrates the incorporation of adaptive blanking in a synchronous rectification controller in accordance with embodiments described herein.

FIG. 7 illustrates a topology of a controller 700 in accordance with embodiments described herein. The SR controller 700 may have six pins including a capacitor pin 715 that may be the general supply pin of the controller. The capacitor pin 715 may be connected to an external supply capacitor 140 (illustrated in FIG. 1). The capacitor 140 may be charged by charge current supply 720 and a drain pin 725 if an external voltage 730 is Low or by the diode 735 if the external voltage 730 is High. The controller 700 may also include a source sensing terminal 740, ground input 750 and $V_{GS}$ output 760.

The external voltage 730 may be connected to the output voltage $V_{OUT}$ (illustrated in FIG. 1) of the flyback converter. A flyback converter using a controller 170 as described herein may be used with battery chargers in several situations. In an empty battery a minimum converter voltage may be 2V and this voltage may be too low to supply the controller 170. In this case, the controller 170 may be supplied by the charging capacitor current 720 and the drain pin 725. In a charged battery, a converter voltage ($V_{OUT}$) may be 5V which may be sufficient to supply the controller 170. In this instance, the controller 170 may be supplied by the external voltage pin 730.

The external voltage pin 730 is an input to power the SR controller 700. Drain 725 is connected to the drain of the SR switch 154 and may be used for sensing the drain to source voltage $V_{DS}$. Source 740 is connected to the source of the SR switch 154 and may be used to sense $V_{DS}$. Ground 750 may provide a ground power connection to the SR controller 700. Gate 760 is an output terminal to determine the gate voltage $V_{GS}$ of the SR switch 154.

Other components of the SR controller 700 may include a plurality of comparators 705, 706 and 707 that may act as regulation circuitry of the SR switch gate signal 760 output by driver 790 that determines a blanking threshold based on the peak current of the SR switch sensed through drain 725 and source 740. The gate signal 760 may be fed back to the blanking block 780 to set the blanking threshold of $V_{GS}$ and blanking time as illustrated in FIG. 6. Gate signal 760 may also be output to the SR switch 154 as the gate voltage thereof.

An output signal blank 710 may be output from the blanking block 780 to disable the input of the turn-off regulator 706. The block 708 is a protection block protecting against a switching error during blanking. If during the blanking time $V_{DS}$ becomes positive and exceeds the 270 mV threshold of the comparator 707, then the gate 760 will be switched off unconditionally, but this may not happen during normal operation.

In operation, as described herein, drain to source voltage $V_{DS}$ of an SR switch 154 may be sensed and because of the adaptive gate regulation, $I_{SEC}$ can be obtained. If the voltage of the drain 725 drops below the source 740, that may be an indication that there is current flowing that ought to be rectified. The gate 156 may be turned on and $V_{DS}$ is regulated to a constant value, such as −36 mV, indicated with the regulator 705 and the offset source. If then $V_{DS}$ becomes lower than an absolute value thereof, then the gate voltage $V_{GS}$ may be decreased, known as off-regulation, and the level is lowered to 30 mV, in order to avoid an operation range where both ON regulation and OFF regulation are active. The OFF regulation may be controlled by the blanking signal. If the blanking output signal 710 is high, the SR switch 154 cannot be turned off, and the OFF regulation is blocked, and $V_{GS}$ stays on until the blank signal 710, also called the block blanking to the off regulator, becomes zero and the off regulation is enabled again. Regarding the comparator 707, if during the blanking time the drain voltage 725 becomes positive and exceeds a 270 mV threshold, then the gate 760 will be switched off unconditionally. This may be a protection against a switching error during the blanking. The regulation outputs may be fed into a driver circuit 790 that also receives logic via logic block 775 from protection and energy save circuits and a driver supply 714 to select a proper output to the gate 760 of the SR switch.

As noted, the external voltage 730 of the controller 700 may be connected to the output voltage $V_{OUT}$ of the flyback converter 100. The external voltage 730 may have a variety of ranges such as 5V, 9V, 12V, 20V or higher, also defining an internal voltage of the controller 700. In this case the capacitor 140 voltage, which may be used for supplying internal circuits, supplying the blank block, and also making a driver supply for the gate 760. If the external voltage 730 is 5V, the capacitor 715 also has a maximum of 5V, and the blanking circuit 785 works on 5V, and the gate driver 714 may also supply 5V. If the external voltage 730 is 12V, then all circuits work on 12V. If, for example, the external voltage 730 is 20V, then the driver supply 714 may limit the supply of the driver 790 to 12V.

FIG. 7 also illustrates knowledge circuits such as a voltage and current reference circuit 755 that may be a bandgap circuit configured to generate references currents and voltages used in the controller 700 and adaptive blanking circuit 600. The voltage and current reference circuit 755 generates voltages and currents for every circuit that needs it, including but not limited to current sources 606, 607, and 608, the current source 630, voltage reference 610, POR 671, and ES 672. An energy save control block 770 may provide an energy save (ES) input signal within the controller. An under voltage lockout block 765 is a protection circuit that may disable switching of the Gate 760 and the controller 700 if the supply voltage on the Cap pin 715 is too low for guaranteeing good operation.

Figure 8:
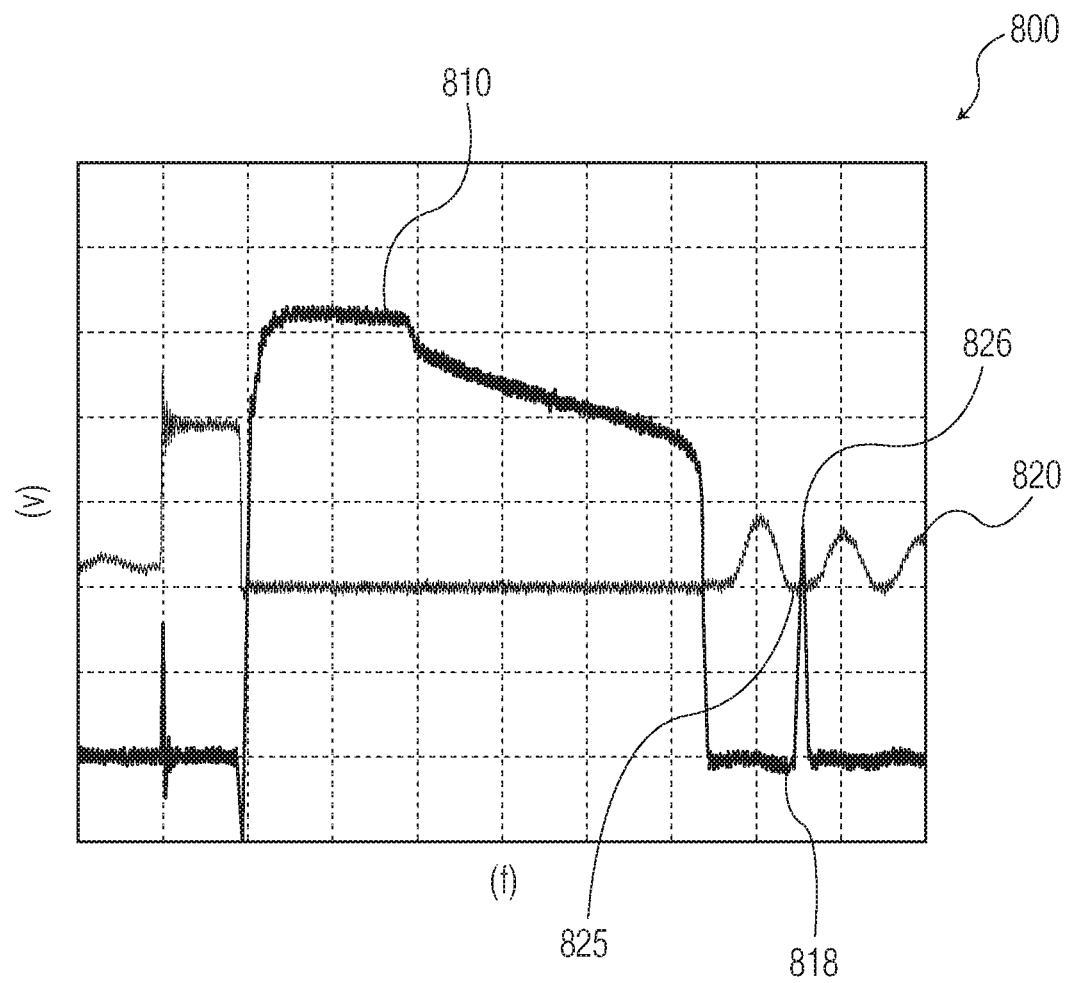
FIG. 8 illustrates waveforms with adaptive blanking in accordance with embodiments described herein.

FIG. 8 illustrates waveforms with adaptive blanking in accordance with embodiments described herein. For high current, an SR switch 154 may operate at a high gate voltage by measuring the $V_{DS}$ of the SR switch during a secondary stroke. The waveform 810 may represent the gate peak voltage applied by the SR controller to the SR switch. $V_{DS}$ is measured and set. If $I_{SEC}$ goes down enough and the blanking time has finished, the gate voltage 810 also goes down, and that may make the lower current with a high $R_{ON}$ have the same $V_{DS}$. So $V_{DS}$ may be regulated to a constant level.

After a gate is set to a zero voltage at 818, the valley of the drain voltage during low frequency ringing can cause a short negative drain-source voltage on the SR switch that results in turn-on of the SR switch at 826 and then directly turns off the SR switch with a zero blanking time. If $I_{SEC}$ is low, $V_{GS}$ will be low, and the blanking can be very low, or even zero.

The signal 820 represents the drain voltage (20V/div) and the signal 810 represents the gate voltage (1V/div). Illustrated may be a flyback converter with 5V output voltage.

For the maximum gate voltage of 5V the blanking time may be maximum and the gate voltage $V_{GS}$ follows a monotonic curve in that it increases to the maximum without partial discharging, remains on the maximum level until the blanking expires, and decreases gradually without ringing.

For a short current pulse having low frequency ringing the SR switch 154 turns on with a gate voltage just above the threshold (2.5V) and instantaneously turns off after the small current pulse without any blanking.

The embodiments can be applied in switch mode power supplies as used for chargers and adapters and in power supplies as used for desktop computers and television sets.

The adaptive blanking function means that in an existing power supply the SR switch is driven in an efficient way without additional gate drive switching losses and that the switching frequency can be chosen over a wide range. The adaptive blanking does not need an adjustment with external components for minimum on-time and minimum off-time.

For high $I_{SEC}$, a controller may operate $V_{GS}$ at a high gate voltage by measuring $V_{DS}$ of the SR switch 154. As illustrated in FIG. 8, $V_{DS}$ is measured. If $I_{SEC}$ (not illustrated) goes down, and 810 also goes down, it is because $V_{DS}$ is regulated to a constant value. If $I_{SEC}$ then goes down, $V_{GS}$ also goes down after the blanking period has finished, and that makes a lower current with a high $R_{ON}$ still gets the same $V_{DS}$ voltage. During the blanking time $V_{GS}$ is constant and thus $R_{ON}$ is constant. When $I_{SEC}$ varies during the blanking time, $V_{DS}$ will also vary.

In embodiments described herein, there is no energy transfer that may not leave some ringing in the converter 170 because after each energy stroke, the capacitors are charged and they discharge via inductance that can give some LC ringing, FIG. 8, for example.

Once $V_{DS}$ drops to a low level, the start of the secondary stroke begins and then the voltage 810 rises to a maximum level defined by $I_{SEC}$. $V_{GS}$ stays on that level without ringing even if there is large ringing of $I_{SEC}$. When $I_{SEC}$ decreases and the blanking time has finished, the $V_{GS}$ also decreases until the end of the stroke. $V_{DS}$ 820 may then start ringing. As illustrated in FIG. 8, in the second valley 825 of the ringing, there is a $V_{GS}$ spike 826, that means that the ringing causes a short current pulse in the transformer, which is fine. If the spike 826 occurs, the SR 154 may switch on but then switches directly off again. Thus there is not a problem with ringing that keeps the SR switch 154 on that would allow $I_{SEC}$ to flow back towards the secondary winding.

Thus in adaptive blanking, for large secondary currents, there may be a large blanking value. For small currents there may be a minimal blanking value, and zero blanking time.

Thus embodiments described herein adapt the blanking times to the amplitude of the secondary current through the SR switch.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A method to control the synchronous rectification in a power converter including a primary winding and a secondary winding, comprising:
    detecting a peak current in a secondary winding;
    determining a blanking threshold based on the peak current; and
    blanking a turning off of a synchronous rectifier (SR) switch for a blanking time based on the blanking threshold;
    wherein determining the blanking threshold comprises:
        sensing a drain to source voltage of a switch connected in series with the secondary winding;
        charging the gate voltage of the SR switch until the sensed drain to source voltage reaches a predetermined regulation level.

2. The method of claim 1, wherein the gate voltage has a monotonic relation with the peak current when the drain to source voltage is regulated to a constant level.

3. The method of claim 1, wherein the peak current related signal is obtained by measuring the gate voltage with a constant and regulated drain to source voltage.

4. The method of claim 1, wherein the blanking time is a function of the peak current and where the blanking time gradually increases with the peak current.

5. The method of claim 1, wherein the blanking time is zero for low peak currents.

6. The control method of claim 5, where the zero blanking time is applied for a SR gate voltage just above the threshold of a logic level FET in low voltage applications and for a SR gate voltage just above the threshold of a standard level FET in high voltage applications.

7. The method of claim 1, wherein the blanking time is zero for SR switch turn-on by low frequency ringing between the end of a secondary stroke and the beginning of a next primary stroke.

8. The method of claim 1, wherein blanking the turning off of the SR switch comprises:
　charging the capacitor; and
　outputting a blanking signal for an increasing duration based on the charging level of the capacitor.

9. The method of claim 8, comprising stopping the blanking signal when a capacitor voltage equals the regulated gate voltage.

10. The method of claim 1, wherein a blanking signal is turned off when the blanking time corresponds to the blanking threshold.

11. A power converter, comprising:
　a secondary current winding configured to receive a peak current;
　a synchronous rectifier (SR) switch configured to rectify current in the secondary winding, the SR switch having a source, drain and gate;
　an SR controller to control the SR switch, the SR controller comprising:
　　a peak current detector configured to produce an output signal related to the peak current value of a secondary current; and
　　a blanking circuit configured to set a blanking time based upon the output gate signal related to the peak current value
　　wherein the peak current is obtained by measuring a drain to source voltage of the SR switch with the SR gate charged such that a defined VDS voltage is reached.

12. The power converter of claim 11, wherein the blanking time is a function of the peak current and where the blanking time gradually increases with the peak current.

13. A power converter, comprising:
　a secondary winding having a peak current;
　a synchronous rectifier (SR) switch to rectify current in the secondary winding;
　an SR controller to control the SR switch, the SR controller comprising:
　　a detecting circuit to detect a peak current in the secondary winding;
　　regulation circuitry to determine a blanking time based on the peak current; and
　　a blanking circuit to blank the SR switch for the blanking time;
　　wherein blanking the SR switch comprises: charging a capacitor; and
　　outputting a blanking signal for an increasing duration based on the charging level of the capacitor.

14. The converter of claim 13, wherein the blanking circuit comprises:
　a current source to power a current loop, the current loop including a resistor and the capacitor;
　a comparator block to compare a charge level of the capacitor to the gate voltage.

15. The converter of claim 14, wherein the blanking time is defined by a value of the resistor multiplied by a value of the capacitor.

16. The converter of claim 13, wherein the blanking time is independent of a converter output voltage and controller supply voltage.

17. The converter of claim 13, wherein the blanking circuit comprises:
　an input to represent a representation of the peak current of the SR switch; and
　a latching component to output a blanking signal that prevents ringing in the current of the secondary winding from interfering with gate switching of the SR switch.

18. A power converter, comprising:
　a secondary winding having a peak current;
　a synchronous rectifier (SR) switch to rectify current in the secondary winding;
　an SR controller to control the SR switch, the SR controller comprising:
　　a detecting circuit to detect a peak current in the secondary winding;
　　regulation circuitry to determine a blanking time based on the peak current; and
　　a blanking circuit to blank the SR switch for the blanking time;
　　wherein the blanking circuit comprises:
　　an input to represent a representation of the peak current of the SR switch; and
　　a latching component to output a blanking signal that prevents ringing in the current of the secondary winding from interfering with gate switching of the SR switch.

\* \* \* \* \*